United States Patent
Coppens et al.

(10) Patent No.: US 9,410,054 B2
(45) Date of Patent: Aug. 9, 2016

(54) COMPOSITION AND METHOD FOR PROVIDING STAIN RELEASE OR STAIN REPELLENCY TO SUBSTRATES

(71) Applicant: 3M INNOVATIVE PROPERTIES COMPANY, St. Paul, MN (US)

(72) Inventors: Dirk M. Coppens, Beveren (BE); Leonardus A. M. Doelen, Moenchengladback (DE)

(73) Assignee: 3M Innovative Properties Company, St. Paul, MN (US)

( * ) Notice: Subject to any disclaimer, the term of this patent is extended or adjusted under 35 U.S.C. 154(b) by 90 days.

(21) Appl. No.: 14/310,688

(22) Filed: Jun. 20, 2014

(65) Prior Publication Data

US 2014/0303305 A1     Oct. 9, 2014

Related U.S. Application Data

(62) Division of application No. 13/139,621, filed as application No. PCT/US2009/068018 on Dec. 15, 2009, now abandoned.

(30) Foreign Application Priority Data

Dec. 19, 2008 (GB) .................. 0823092.2

(51) Int. Cl.
| | |
|---|---|
| *C09D 133/08* | (2006.01) |
| *C04B 41/00* | (2006.01) |
| *C04B 41/50* | (2006.01) |
| *C09D 133/00* | (2006.01) |
| *C09D 5/16* | (2006.01) |

(52) U.S. Cl.
CPC ............ *C09D 133/08* (2013.01); *C04B 41/009* (2013.01); *C04B 41/5089* (2013.01); *C09D 5/1637* (2013.01); *C09D 5/1668* (2013.01); *C09D 133/00* (2013.01)

(58) Field of Classification Search
CPC  C04B 41/009; C04B 41/5089; C04B 41/483; C04B 41/4842
See application file for complete search history.

(56) References Cited

U.S. PATENT DOCUMENTS

| | | | |
|---|---|---|---|
| 5,395,658 A | 3/1995 | Jaklin | |
| 5,702,509 A | 12/1997 | Pellerite | |
| 5,798,415 A | 8/1998 | Corpart | |
| 7,049,379 B2 | 5/2006 | Jariwala | |
| 7,078,456 B2 | 7/2006 | Jariwala | |
| 7,232,479 B2 | 6/2007 | Poulet | |
| 2002/0045010 A1 | 4/2002 | Rohrbaugh | |
| 2005/0075471 A1 | 4/2005 | Fan | |
| 2005/0288413 A1 | 12/2005 | Zheng | |
| 2007/0066780 A1 | 3/2007 | Ueda | |
| 2007/0167551 A1* | 7/2007 | Goodwin | C08K 3/0033 524/442 |
| 2007/0197717 A1* | 8/2007 | Ueda | C04B 41/009 524/544 |
| 2007/0219331 A1 | 9/2007 | Ishikawa | |
| 2008/0113200 A1 | 5/2008 | Peng | |
| 2008/0166486 A1 | 7/2008 | Carcelli | |
| 2011/0086971 A1 | 4/2011 | Ueda | |

FOREIGN PATENT DOCUMENTS

| | | |
|---|---|---|
| CN | 1187425 | 2/2005 |
| CN | 101139500 | 3/2008 |
| EP | 1640387 | 3/2006 |
| EP | 1265827 | 7/2006 |
| EP | 1743910 | 1/2007 |
| JP | 11077677 | 3/1999 |
| JP | 11217540 | 8/1999 |
| JP | 2007-070551 | 3/2007 |
| WO | WO 02-04383 | 1/2002 |
| WO | WO 2005-083014 | 9/2005 |
| WO | WO 2007-127267 | 11/2007 |
| WO | WO 2008/057353 | 5/2008 |

OTHER PUBLICATIONS

AATCC—American Association of Textile Chemists and Colorists Test Method 118-1983, "Oil Repellency: Hydrocarbon Resistance Test", 1983, 1page.
International Search Report for PCT/US2009/068018, mailed Aug. 2, 2010, 6 page.
Supplementary European Search Report for EP Application No. 09837876.3, mailed Jun. 8, 2015.

* cited by examiner

*Primary Examiner* — Wenwen Cai

(57) ABSTRACT

The present invention provides a composition for treatment, the composition comprising dispersed in water (i) a fluorinated compound, (ii) a potassium or lithium silicate and (iii) an acrylic polymer. The invention further provides a method of treating substrates with the composition.

17 Claims, No Drawings

COMPOSITION AND METHOD FOR PROVIDING STAIN RELEASE OR STAIN REPELLENCY TO SUBSTRATES

BACKGROUND

The present invention relates to a composition for treatment for providing stain release or stain repellence properties to substrates, in particular hard surfaces such as natural and man-made stone. In a particular aspect, the composition comprises a fluorinated compound, a potassium or lithium silicate and an acrylic polymer.

Hard surface substrates, in particular natural or man-made stones are frequently used in the building industry and outdoor environment in a decorative way. When left unprotected, hard surfaces may loose their original appearance from exposure to weathering and soil. In order to protect hard surfaces they are often sealed with a film-forming resin, such as an epoxy or urethane product. These coating materials are often quite expensive and may undesirably alter the appearance of the coated substrate.

In order to protect substrates against water and increase the surface strength, moisture resistance coatings have been proposed. For example US2008166486 relates to a moisture resistant concrete coating composition comprising a water dispersible resin, such as an acrylic resin, an alkoxysilane, a mineral aggregate comprising silica and an extender composition comprising a silicate.

U.S. Pat. No. 5,395,658 discloses a method for improving the frost-de-icing salt resistance of concrete structures comprising applying to the surface of a concrete structure an alkali silicate solution.

Fluorochemical-containing treatments have been proposed to render substrates resistant to soil and repellent to water- and oil-based stains. For example, WO2007127267 discloses a composition for treating masonry to improve its stain resistance as well as providing water and oil repellency. The composition utilizes a fluorine-containing polymer and at least one silicone compounds selected from silanes and siloxanes. The composition may be dispersed in an organic solvent for application to the masonry substrate followed by elimination of the solvent.

WO2007127267 discloses a composition for treating masonry to improve its stain resistance as well as providing water and oil repellency. The composition utilizes a fluorine-containing polymer and at least one silicone compounds selected from silanes and siloxanes. The composition may be dispersed in an organic solvent for application to the masonry substrate followed by elimination of the solvent.

U.S. Pat. No. 5,702,509 discloses a composition comprising a polysiloxane reaction product of a) at least one alkoxysilane, alkoxysiloxane or siloxane compound comprising at least one hydrophobic moiety; b) at least one alkoxysilane, alkoxysiloxane or siloxane compound comprising at least one hydrophilic moiety and c) at least one fluorine-containing alkoxysilane compound capable of reaction with component a) and/or b). The composition can be used to render substrates, especially porous substrates water- and oil repellent.

SUMMARY OF THE INVENTION

Hard surfaces include natural stone, such as granite and marble, and man-made materials, such as concrete, terracotta, grout, etc. Natural and/or man-made stone used in building and outdoor applications are generally vulnerable to soiling. Terrace tiles, for example, can become stained through solid or liquid stains, such as stains made from mud, food and/or beverages. Furthermore, the tiles may lose their original appearance and may gradually deteriorate from exposure to water penetration and weathering. This problem is particularly noticeable with increasing porosity of the substrate. Man-made stone, such as concrete, mortar or grout typically contain a fine capillary pore system formed in the paste by hydration. Due to this capillary system, liquid stains and water can easily penetrate into the substrate.

It would be desirable to find an alternative treatment composition for providing porous hard surfaces, in particular natural and man-made stone, with good stain release or stain repellency such that they can be easily and effectively cleaned and/or are less prone to soiling and weathering. Desirably, such treatment is durable, i.e. the beneficial properties obtained by the treatment aren't easily lost. Further desired properties include good water repellency and/or high oil repellency. Desirably, the treatment provides good repellency properties when applied at room temperature, dries fast and typically does not require curing at elevated temperatures. In particular, it would be desirable to find such treatment that can penetrate well into the porous surface of the stone and is highly effective without changing or undesirably diminishing the aesthetical appeal. Additionally, such coating should typically not cause the surface to be more slippery. Desirably, the composition can be readily manufactured at low cost and can be applied in an easy, convenient and economically feasible way. In particular, it would be desirable to find a composition that can be applied in existing manufacturing method of man-made stone, for example that can be readily used in the manufacture of concrete based articles.

The present invention provides in one aspect a composition for treatment, the composition comprising dispersed in water (i) a fluorinated compound, (ii) a potassium or lithium silicate and (iii) an acrylic polymer.

In a further aspect, the invention provides a method of treatment wherein a composition comprising dispersed in water (i) a fluorinated compound, (ii) a potassium or lithium silicate and (iii) an acrylic polymer, is applied to at least part of a surface of a substrate, for example natural or man-made stone.

In still a further aspect, the invention provides the use of a composition comprising dispersed in water (i) a fluorinated compound, (ii) a potassium or lithium silicate and (iii) an acrylic polymer for providing stain release or stain repellence properties to a substrate, for example natural or man-made stone.

It has been found that hard surface substrates treated with the above described composition typically have good repellency to soiling, and good stain release properties, especially against oil- and water based stains such as common household oil- and water based stains, which are amongst the most severe stains. Stains caused by for example motor oil, cooking oil, food dressings, and beverages, such as wine, coffee, thee and soft drinks can generally be removed from surfaces treated with the composition, by using tap water and a paper towel, in some cases even after the staining substance has been in contact with the substrate for a certain period of time, for example several hours. Furthermore, it has been found that man-made stone, in particular concrete substrates, treated with the above described composition have anti-efflorence properties and high surface strength. Typically the method can be used in an easy and safe way and is compatible with existing manufacturing methods. For example, the compositions can be applied in wet cast manufacturing methods of making concrete based articles. The compositions generally spread well over the surface of the substrate, with the result that typically uniform properties can be achieved over the whole surface of the substrate. The method is generally environmental friendly and conveniently provides a treatment that has minimal impact on the appearance of the substrate.

DETAILED DESCRIPTION

The acrylic polymer used in the composition for treatment is believed to serve as a binder for the fluorinated compound and the silicate and typically increases the compatibility between the fluorinated compound and the silicate. The acrylic polymer typically is a water dispersible acrylic polymer. Examples include all acrylic resins, styrene acrylic resins, urethane styrene acrylic resins, epoxy acrylic resins, and alkyd acrylic resin, or a hybrid of these acrylic resins. Typically the acrylic polymers have a glass transition temperature in the range of −20° C. to 50° C.

Acrylic polymers are well known in the art and are typically prepared from a free radical polymerization reaction of at least one acrylate and/or methacrylate monomer, optionally in the presence of other comonomers. Suitable acrylate and methacrylate monomers comprise an alkyl group having from 1 to 18 carbon atoms. Examples include methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate and stearyl methacrylate.

These monomers may be used alone, or a combination of two or more types can be used.

Suitable copolymerizable monomers include styrene, acrylonitrile and methacrylonitrile and monomers having a functional group, such as amines and hydroxyl groups. Examples include dimethylaminoethyl(meth)acrylate, diethylaminoethyl(meth)acrylate, dimethylaminopropyl (meth)acrylate and N,N-dimethyl-aminopropylacrylamide, 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate, allyl alcohol, acrylic acid and versatic acid glycidyl ester adduct, methacrylic acid and versatic acid glycidyl ester adduct, and the ethylene oxide and/or propylene oxide adducts of (meth) acrylic acid, hydroxyalkyl esters such as 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate and 4-hydroxybutyl methacrylate. One type copolymerizable monomers can be used, or a combination of two or more type can be used.

Particularly suitable comonomer is styrene.

Acrylic polymers useful in the treatment composition are commercially available and include for example styrene-acrylate dispersions such as Acronal™ S 559, Acronal™ S 790 and Acronal™ S 720, all commercially available from BASF, Primal™ AC-337 ER, Primal™ AC-339, available from Rohm and Haas.

The acrylic polymer is typically used in an amount between 10% and 80%, suitably between 20% and 70% by weight of total solids.

The composition for treatment comprises lithium silicate and/or potassium silicate. Silicates useful in the treatment composition are commercially available and include for example Lithium silicate solutions, such as Betolin™ Li22 and Betolin™ Li24, commercially available from Woellner and potassium silicate solutions, such as Betolin™ P35 and Betolin™ P50, commercially available from Woellner and PQ™ K(2,15)34/36 F and PQ™ K(2,5)26/29 F, commercially available from PQ Europe.

The silicate is typically used in an amount between 10% and 80%, suitably between 20% and 70% by weight of total solids.

In one embodiment, the fluorinated compound comprises one or more perfluorinated hydrocarbon residues having at least 3 carbon atoms. In a typical embodiment, the perfluorinated hydrocarbon residues have 4 to 6 carbon atoms each.

In one embodiment, the fluorinated compound comprises one or more units deriving from a fluorinated monomer of the formula:

$$R_f\text{-Q-E} \quad (I)$$

wherein $R_f$ represents a partially or fully fluorinated aliphatic group having 3 to 12 carbon atoms, Q represents a covalent bond or a typically non-fluorinated organic linking group and E represents a free radical polymerizable group.

With "free radical polymerizable group" is meant a group capable of undergoing a free radical reaction when exposed to radicals generated by decomposition of a suitable initiator by heat and/or radiation. Suitable groups include, for example moieties derived from vinyl ethers, vinyl esters, allyl esters, vinyl ketones, styrene, vinyl amide, acrylamides, maleates, fumarates, acrylates and methacrylates. Of these groups vinylether, vinylester, acrylates and methacrylates are preferred.

The fluorinated aliphatic group $R_f$, in the fluorinated monomer, is a partially or fully fluorinated, preferably saturated, non-polar, monovalent aliphatic radical. It can be straight chain, branched chain, or cyclic or combinations thereof. It can contain heteroatoms such as oxygen, divalent or hexavalent sulfur, or nitrogen. $R_f$ is preferably a fully-fluorinated radical, but hydrogen or chlorine atoms can be present as substituents if not more than one atom of either is present for every two carbon atoms. The $R_f$ radical has at least 3 carbon atoms, typically at least 3 and up to 12 carbon atoms, suitably 3 to 10, especially suitable 4 to 6 carbon atoms.

The linking group Q links the fluoroaliphatic group $R_f$ to the ethylenically unsaturated group E and can be a covalent bond or generally a non-fluorinated organic linking group. The linking group Q may be a hydrocarbon group which may optionally be substituted and which generally contains from 1 to about 20 carbon atoms. Linking group Q may optionally contain oxygen, nitrogen, or sulfur-containing groups or a combination thereof, but Q should typically be free of functional groups that substantially interfere with free-radical polymerization (e.g., polymerizable olefinic double bonds, thiols, and other such functionality known to those skilled in the art). Examples of suitable linking groups Q include straight chain, branched chain or cyclic alkylene, arylene or aralkylene groups, sulfonyl, sulfoxy, sulfonamido, carbonamido, carbonyloxy, urethanylene, ureylene, oxy, and combinations thereof such as sulfonamidoalkylene.

In one particular embodiment the fluorinated monomer can be represented by the general formula

$$R_f\text{-Q-C}(R_1)\!\!=\!\!C(R_2)_2 \quad (II)$$

wherein $R_f$ represents a fluorinated aliphatic group having 3 to 12 carbon atoms as defined above, Q is a covalent bond or an organic linking group as defined above; $R_1$ represents hydrogen, halogen or a lower alkyl group having 1 to 4 carbon atoms and each $R_2$ is independently hydrogen or a straight chain or branched chain alkyl of 1 to 4 carbon atoms.

Examples of useful fluorinated monomers include:

$CF_3CF_2CF_2CF_2CH_2CH_2OCOCR_3\!=\!CH_2$
$CF_3(CF_2)_3CH_2OCOCR_3\!=\!CH_2$
$CF_3(CF_2)_3SO_2N(CH_3)CH_2CH_2OCOCR_3\!=\!CH_2$
$CF_3(CF_2)_3SO_2N(C_2H_5)CH_2CH_2OCOCR_3\!=\!CH_2$
$CF_3(CF_2)_3SO_2N(CH_3)CH_2CH(CH_3)OCOCR_3\!=\!CH_2$
$(CF_3)_2CFCF_2SO_2N(CH_3)CH_2CH_2OCOCR_3\!=\!CH_2$
$CF_3CF_2(CF_2CF_2)_2CH_2CH_2OCOCH\!=\!CH_2$ wherein $R_3$ is hydrogen, methyl or n-butyl.

In a further embodiment of the invention the fluorinated compound comprises an oligomeric residue of the formula:

$$G\text{-}(M^f)_i\text{-}(M^h)_j\text{-}S\text{---} \quad\quad (III)$$

wherein G represents H or a residue of a free radical initiator, $M^f$ represents a unit deriving from a fluorinated monomer, $M^h$ represents a unit of a non-fluorinated monomer, i has a value of 1 to 20 and j has a value of 0 to 20 with the proviso that the sum of i+j is at least 2.

The terms 'oligomer' or 'oligomeric' when used herein designate a residue comprising a plurality of polymerized units, generally from 2 to 25 units, typically from 3 to 10 or from 4 to 8 units. The units $M^f$ of the fluorinated compound are generally derived from one or more fluorinated monomers. Examples of fluorinated monomers include those that can be represented by the formula II and as described above.

The units $M^h$ of the oligomeric residue (when present) are generally derived from a non-fluorinated monomer, preferably a monomer consisting of a free radical polymerizable group and a hydrocarbon moiety. Hydrocarbon group containing monomers are well known and generally commercially available. Examples of non-fluorinated monomers from which units $M^h$ can be derived include general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, N,N-diethylaminoethylmethacrylate, N-t-butylamino ethyl methacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, and allyl or vinyl halides such as vinyl and vinylidene chloride. Preferred non-fluorinated monomers include hydrocarbon group containing monomers such as those selected from octadecylmethacrylate, laurylmethacrylate, butylacrylate, N-methylol acrylamide, isobutylmethacrylate, ethylhexyl acrylate and ethylhexyl methacrylate; and vinylchloride and vinylidene chloride.

In a typical embodiment the non-fluorinated monomer can be represented by the formula:

$$R_h\text{-}Q'\text{-}C(R^3)\!=\!C(R^4)_2 \quad\quad (IV)$$

wherein $R_h$ represents a non-fluorinated group, Q' is a covalent bond or an organic linking group as defined for Q above; $R^3$ represents hydrogen or a lower alkyl group having 1 to 4 carbon atoms and each $R^4$ is independently hydrogen or a straight chain or branched chain alkyl of 1 to 4 carbon atoms.

The oligomeric residue according to formula III can be derived from an oligomer that can be prepared by a free-radical polymerization of fluorinated and optionally non-fluorinated monomers. The polymerization is typically carried out in the presence of a free radical initiator. Such free radical initiators are known in the art and include azo compounds, such as azobisisobutyronitrile (AIBN) and azobis(2-cyanovaleric acid), hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauroyl peroxide.

The free radical polymerization can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., toluene), ethers (e.g., diethylether, glyme, diglyme, diisopropyl ether), esters (e.g., ethyl acetate, butyl acetate), ketones (e.g., acetone, methyl ethyl ketone, methyl isobutyl ketone), amides (e.g., N,N-dimethylformamide, N,N-dimethylacetamide), halogenated solvents such as $C_4F_9OCH_3$ or trifluorotoluene, and mixtures thereof. Particularly suitable solvents include ethylacetate, methylethyl ketone and acetone.

The polymerization can be carried out at any temperature suitable for conducting an organic free-radical reaction. Particular temperature and solvents for use can be easily selected by those skilled in the art based on considerations such as the solubility of reagents and the temperature required for the use of a particular initiator. While it is not practical to enumerate a particular temperature suitable for all initiators and all solvents, generally suitable temperatures are between 30° C. and 200° C.

The polymerization to form the oligomer is typically done in the presence of a mercapto functional chain transfer agent. Suitable chain transfer agents can be represented by the formula $R'(SH)_m$, wherein R' represents an hydrocarbon group, optionally comprising a functional group, and m is 1 to 4.

In one embodiment, the hydrocarbon group may be an alkyl group having 1 to 54 carbon atoms, preferably 2 to 36 carbon atoms. Examples of such chain transfer agents include n-octyl mercaptan, octadecyl mercaptan and dodecyl mercaptan. In a further embodiment, the chain transfer agent comprises a functional group. Examples of chain transfer agents having a functional group include 2-mercaptoethanol, 3-mercapto-1,2-propanediol, 4-mercaptobutanol, 11-mercaptoundecanol, mercaptoacetic acid, 3-mercaptopropionic acid, 12-mercaptododecanoic acid, 2-mercaptoethylaamine, 1-chloro-6-mercapto-4-oxahexan-2-ol, 2,3-dimercaptosuccinic acid, 2,3-dimercaptopropanol, 3-mercaptopropyltrimethoxysilane, 2-chloroethanethiol, 2-amino-3-mercaptopropionic acid, methyl 3-mercaptopropionate, mercaptoacetic acid, 2-mercaptobenzimidazole, 2-mercaptobenzoic acid, 2-mercaptobenzothiazole, 2-mercaptobenzoxazole, 3-mercapto-2-butanol, 2-mercaptosulfonic acid, 2-mercaptonicotinic acid, 4-hydroxythiopheno3-mercapto-1,2-propanediol, 1-mercapto-2-propanol, 2-mercaptopropionic acid, N-(2-mercaptopropionyl)glycine, 3-mercaptopropyltrimethoxysilane, 2-mercaptopyridine, 2-mercaptopyridine-N-oxide, 2-mercaptopyridinol, mercaptosuccinic acid, 2,3-mercaptopropanesulfonic acid, 2,3-dimercaptopropanol, 2,3-dimercaptosuccinic acid, cystine, cystine hydrochloride, cystine ethylester. Also suitable are chain transfer agents bearing a functional group that are reacted with one or more compound having a functional group. Examples include for example adducts of 2-mercaptoethylamine and caprolactam and adducts of stearyl dimerdiol with mercaptopropionic acid.

A single chain transfer agent or a mixture of different chain transfer agents may be used. A chain transfer agent is typically present in an amount sufficient to control the number of polymerized monomer units in the oligomer and to obtain the desired molecular weight of the oligomer. The chain transfer agent is generally used in an amount of 0.05 to 0.5 equivalents, suitably 0.1 to 0.4 equivalents, per equivalent of monomer including fluorinated and non-fluorinated monomers.

When the chain transfer agent bears a functional group, the oligomer made in the presence thereof has a functional group that may be further reacted with a compound having another functional group. The nature of the functional groups on both the oligomer and the compounds are chosen so that they are reactive toward one another. Examples of mutually reactive pairs include an acyl group (such as a carboxylic acid, acyl halide or ester) reacting with an alcohol or amine, an alcohol or an amine reacting with a 'leaving group' such as a halide or tosylate, and an isocyanate reacting with an isocyanate reactive group. With the term 'isocyanate reactive group' in connection with the invention is meant a functional group that will react with an isocyanate group under typical reactive conditions for reacting an isocyanate group. Typical reactive conditions include reacting at a temperature of 20 to 150° C., for example 30 to 120° C. and typically involve the use of a catalyst. Generally, an isocyanate reactive group includes at least one Zerewittenoff hydrogen. Though not intended to be limiting, examples of isocyanate reactive groups include: alcohols, amines, thiols and carboxylic acids and derivatives thereof. Useful isocyanate reactive groups include for example —OH, —NH— or —NH$_2$ and —SH, —CO$_2$R$^3$, where R$^3$ is hydrogen or hydroxyalkyl, —C(O)N(R$^1$)(R$^2$), where R$^1$ and R$^2$ are independently hydrogen, hydroxyalkyl or polyalkylenepolyamine. Particularly useful isocyanate reactive groups include —OH, —NH— and —NH$_2$ groups.

In one embodiment, the fluorinated compound can be derived from a fluorinated oligomer having an isocyanate reactive group, an isocyanate and optionally an aliphatic compound having an isocyanate reactive group.

Suitable isocyanates include mono isocyanates and polyisocyanates. Examples of monoisocyanates include octadecylisocyanate, butyl isocyanate, hexyl isocyanate, phenyl isocyanate, benzyl isocyanate, naphtyl isocyanate and mixtures thereof. Examples of polyisocyanates include aliphatic and aromatic isocyanates having 2, 3 or 4 isocyanate groups and mixtures thereof. Examples of aliphatic diisocyanates include hexamethylenediisocyanate, 2,2,4-trimethyl-1,6-hexamethylenediisocyanate, and 1,2-ethylenediisocyanate, dicyclohexylmethane-4,4'-diisocyanate and 3-isocyanatomethyl-3,5,5-trimethylcyclohexylisocyanate (isophorone diisocyanate IPDI). Examples of aliphatic triisocyanates include 1,3,6-hexamethylenetriisocyanate, cyclic trimer of hexamethylenediisocyanate and cyclic trimer of isophorone diisocyanate (isocyanurates). Examples of aromatic diisocyanates include 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate. Examples of aromatic triisocyanates include polymethylenepolyphenylisocyanate (PAPI).

Also useful are isocyanates containing internal isocyanate-derived moieties such as biuret-containing triisocyanates, such as DESMODUR™ N100 or TOLONATE HDB, commercially available from Bayer or Rhodia respectively; isocyanurate-containing tri-isocyanates, such as IPDI-1890, commercially available from Huls AG; azetedinedione-containing diisocyanates such as DESMODUR™ TT, commercially available from Bayer. Also, other commercially available di- or tri-isocyanates such as DESMODUR™ L and DESMODUR™ W, tri-(4-isocyanatophenyl)-methane (DESMODUR™ R) (all available from Bayer) and DDI 1410 (available from Cognis) are suitable.

The aliphatic compound having an isocyanate reactive group can be represented by the formula R$^3$—(Z)$_q$, where Z is an isocyanate reactive group, such as an amino group, a hydroxy group or a carboxyl group and q is 1 to 4, preferably 1. R$^3$ is a mono- or polyvalent, linear or branched chain, saturated or unsaturated, cyclic or acyclic (or any combination thereof) organic aliphatic group having from 1 to 75 carbon atoms. In certain embodiments R$^3$ may be fluorinated (i.e. R$^3$=Rf). Preferably R$^3$ has 12 to 75 carbon atoms. More preferably R$^3$ is a monovalent alkyl group having from 12 to 75 carbon atoms. Examples of aliphatic compounds having isocyanate reactive group include stearylalcohol, and lauryl alcohol Particular preferred compound includes stearylalcohol, The fluorinated compound may be prepared by reacting a (poly)isocyanate, the fluorinated oligomeric compound having an isocyanate-reactive terminal group; and the optional aliphatic compound having an isocyanate-reactive group. The reactive components may be combined in one reaction to form the reaction products. In an alternative embodiment, the (poly)isocyanate may be reacted with the fluorinated oligomeric compound, optionally followed by reaction with the aliphatic compound, or the polyisocyanate may be reacted first with the aliphatic compound, followed by reaction with the fluorinated oligomeric compound.

The fluorinated compound can be prepared in the presence of an organic solvent, free of isocyanate reactive groups. Suitable examples include ethylacetate, methylisobutyl ketone, acetone and halogenated solvents such C$_4$F$_9$OCH$_3$ or trifluorotoluene.

When a polyisocyanate is used, the molar ratio of fluorinated oligomeric compound having an isocyanate reactive group to polyisocyanate is generally from 10 to 95% of the available isocyanate groups, with the balance of the isocyanate groups reacted with the aliphatic compound.

It will be understood that a mixture of fluorinated oligomeric compounds will be formed, which is generally a statistical mixture of substitution products on the polyisocyanate. Any remaining isocyanate groups may be reacted or hydrolyzed as desired. In some embodiments it may be desirable to leave some small percentage of the available isocyanate groups unreacted, generally less than 10%, and hydrolyze the remaining. In the presence of a small amount of water, the unreacted isocyanates will react to form urea links between isocyanate residues.

The isocyanate condensation reaction is typically carried out in the presence of a catalyst. Depending on reaction conditions (e.g., reaction temperature and/or polyisocyanate used), a catalyst level of up to about 0.5 percent by weight of the total weight of the reactant mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co.), and 1,8-diazabicyclo [5.4.0]undec-7-ene (DBU, Aldrich Chemical Co.).

In yet a further embodiment, the fluorinated compound corresponds to one of the following formulas:

     V or

     VI wherein m is a value of 1 to 4, n is a value of 1 to 4, L represents a linking group, R is an aliphatic group and A is a fluorinated residue of the formula:

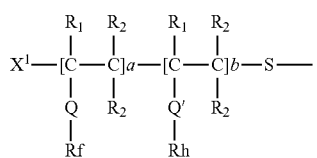     VII wherein a has a value of 1 to 100, b has a value of 0 to 100 with the sum of a and b being at least 2, $R_1$ and $R_2$ each independently represent H or an alkyl group of 1 to 4 carbon atoms, $R_1$ can also represent a halogen; Q and Q' each independently represent a covalent bond or an organic linking group as defined above, Rf represents a partially or fully fluorinated aliphatic group group and is as defined above, Rh represents a non-fluorinated group and $X^1$ is H or the residue of a free radical initiator.

The fluorinated compounds according to formulas V and VI comprise an alkylated fluorinated compounds having a plurality of pendent Rf groups and generally have three principal portions: at least one fluorinated polymeric portion 'A', a linking group 'L', and at least one aliphatic moiety 'R'.

The fluorinated polymeric portion and the aliphatic moiety R are linked together by linking group L. The linking group may be a covalent bond, may result from a condensation reaction between a nucleophile, such as an alcohol, an amine, or a thiol, and an electrophile such as a carboxylic acid, ester, acyl halide, sulfonate ester, sulfonyl halide, cyanate, isocyanate, or may result from a nucleophilic displacement reaction between a nucleophile and a moiety bearing a leaving group, such as the reaction between an alcohol (or alkoxide) and an alkyl halide (where the halogen atom of the alkyl halide serves as a leaving group).

Examples of suitable linking groups L include a covalent bond, straight chain, branched chain, or cyclic alkylene, arylene, aralkylene, oxy, oxo, hydroxy, thio, sulfonyl, sulfoxy, amino, imino, sulfonamido, carboxamido, carbonyloxy, urethanylene, ureylene, and combinations thereof such as sulfonamidoalkylene.

The aliphatic group R in compounds of Formulas V and VI is a mono-, di-, tri- or tetravalent, linear or branched chain, saturated or unsaturated, cyclic or acyclic (or any combination thereof) organic aliphatic group having at least one, preferably from 12 to 75 carbon atoms. In certain embodiments R may be fluorinated (i.e. R=Rf). The valency is equivalent to the value of n in Formula V and is equal to 1 in Formula VI. Suitably R is a monovalent alkyl group having at least one, preferably from 12 to 75 carbon atoms, most preferably 16 to 60 carbon atoms. Where more than one R group is present, such as in Formula VI, or when n is greater than one in Formula VI, the sum of the carbon atoms in the R groups is preferably from 12 to 100 carbon atoms.

The fluorinated compound of formulas V and VI can be prepared through a free radical polymerization of a fluorinated monomer with optionally a non-fluorinated monomer in the presence of a chain transfer agent. A free radical initiator is generally used to initiate the polymerization reaction. Commonly known free-radical initiators can be used and examples thereof include azo compounds, such as azobisisobutyronitrile (ABIN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The free radical polymerization can be carried out in any solvent suitable for organic free-radical reactions as described above. The reactants can be present in the solvent at any suitable concentration, e.g., from about 5 percent to about 90 percent by weight based on the total weight of the reaction mixture.

The polymerization can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

The fluorochemical polymer is prepared in the presence of a chain transfer agent. Suitable chain transfer agents include those that can be represented by the formula $R'(SH)_m$, as described above, wherein R' represents a hydrocarbon group, optionally comprising a functional group, and m is 1 to 4.

In one embodiment, the hydrocarbon group may be an alkyl group having 1 to 75 carbon atoms, preferably 4 to 36. Examples of such chain transfer agents include n-octyl mercaptan, octadecyl mercaptan and dodecyl mercaptan. When R' represents an alkyl group, the linking group L in formulas V and VI represents a covalent bond.

In another embodiment, the hydrocarbon group includes one or more functional groups. When the chain transfer agent bears a functional group, the fluorinated polymer made in the presence thereof will have a functional group that may be further reacted with a functional aliphatic compound to form the linking group L and incorporate the R group into the compounds of Formulas V and VI. The nature of the functional groups on both the chain transfer agent and the aliphatic compounds are chosen so that they are reactive toward one another to form the L linking group. Examples of mutually reactive pairs include an acyl group (such as a carboxylic acid, acyl halide or ester) reacting with an alcohol or amine, an alcohol or an amine reacting with a 'leaving group' such as a halide or tosylate, and an isocyanate reacting with an alcohol or amine.

Examples of chain transfer agents having a functional group are as described above. A single chain transfer agent or a mixture of different chain transfer agents may be used. A chain transfer agent is typically present in an amount sufficient to control the number of polymerized monomer units in the polymer and to obtain the desired molecular weight of the fluorinated polymer. The chain transfer agent is generally used in an amount of 0.05 to 0.5 equivalents, suitably 0.1 to 0.4 equivalents, per equivalent of monomer including fluorinated and non-fluorinated monomers.

In one embodiment the chain transfer agent comprises an isocyanate reactive group and the fluorinated polymer made in the presence therewith will accordingly have the same isocyanate reactive group. In that case, the fluorinated polymer will be prepared in the presence of an organic solvent free of isocyanate reactive groups. Suitable examples include ethylacetate, methylisobutyl ketone, acetone and halogenated solvents such $C_4F_9OCH_3$ or trifluorotoluene.

The fluorinated compound according to formulas V and VI can be prepared from the fluorinated polymer comprising an isocyanate reactive group and an isocyanate and optionally an aliphatic compound having an isocyanate reactive group.

Suitable isocyanates include mono isocyanates and polyisocyanates. Useful mono isocyanates include isocyanates having an aliphatic group. Examples include octadecylisocyanate, butyl isocyanate, hexyl isocyanate. Particularly suitable mono isocyanate is octadecylisocyanate. Useful polyisocyanates include aliphatic and aromatic isocyanates having 2, 3 or 4 isocyanate groups and mixtures thereof. Further useful polyisocyanates include isocyanates containing internal isocyanate-derived moieties. Examples of useful polyisocyanates are as described above.

The aliphatic compound having an isocyanate reactive group can be represented by the formula $R^3$—$(Z)_q$, and is as described above.

The fluorinated compound according to formulas V and VI can be prepared in a multistep reaction. In a first step, the fluorinated polymer comprising the isocyanate reactive group is prepared as described above. In a second step, in one embodiment the fluorinated polymer is further reacted with a monoisocyanate having an aliphatic group. In an alternative embodiment, the fluorinated polymer having an isocyanate functional group is further reacted with a polyisocyanate and an aliphatic compound having an isocyanate reactive group. The three reactive components may be combined in one reaction to form the reaction products. In an alternative embodiment, the polyisocyanate may first be reacted with the fluorinated polymer, followed by reaction with the aliphatic compound, or the polyisocyanate may first be reacted with the aliphatic compound, followed by reaction with the fluorinated polymer.

When a polyisocyanate is used, the molar ratio of fluorinated oligomeric compound having an isocyanate reactive group to polyisocyanate is generally from 10 to 95% of the available isocyanate groups, with the balance of the isocyanate groups reacted with the aliphatic compound.

It will be understood that a mixture of fluorinated compounds will be formed, which is generally a statistical mixture of substitution products on the polyisocyanate. Any remaining isocyanate groups may be reacted or hydrolyzed as desired. In some embodiments it may be desirable to leave some small percentage of the available isocyanate groups unreacted, generally less than 10%, and hydrolyze the remaining. In the presence of a small amount of water, the unreacted isocyanates will react to form urea links between isocyanate residues.

The isocyanate condensation reaction is typically carried out in the presence of a catalyst. Depending on reaction conditions (e.g., reaction temperature and/or polyisocyanate used), a catalyst level of up to about 0.5 percent by weight of the total weight of the reactant mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co.), and 1,8-diazabicyclo [5.4.0.]undec-7-ene (DBU, Aldrich Chemical Co.). With reference to Formulas III and V to VII, it will be understood that the fluorinated compound may have a random distribution of fluorinated and fluorine-free segments, or a sequential arrangement where the fluorinated compound comprises 'blocks' of fluorinated and fluorine-free segments. Further it will be understood that the relative position of the units derived from fluorinated monomers and fluorine-free monomers may vary with respect to the G, Y and S moieties.

Fluorinated compounds useful in the composition according to the invention have been disclosed for example in U.S. Pat. No. 7,049,379 and U.S. Pat. No. 7,078,456.

The treatment composition according to the invention typically comprises an amount of fluorinated compound between 5% and 70%, suitably between 10% and 70% by weight, for example between 15% and 60% by weight of the total weight of solids.

The treatment composition is typically used as an aqueous composition, in particular an aqueous dispersion in water. To prepare the aqueous dispersion, the fluorinated compound together with the acrylic polymer and the silicate compound are dispersed in water, in the presence of ionic or non-ionic surfactants. If the fluorinated compound is made by solution polymerization, preferably the composition in solvent will be turned into an aqueous dispersion by adding water and subjecting the composition to vigorous stirring in the presence of a surfactant. Typically the mixture is then subjected to an ultrasonic treatment or a treatment in a high pressure homogenizer.

Generally the aqueous dispersion as a concentrate contains up to 60% by weight of an active composition (fluorinated compound, silicate and acrylic polymer), 0.5 to 15% by weight of one or more surfactants, and 0 to 30% by weight of a solvent or solvent mixture, the remainder being water.

Solvents useful in the preparation of the aqueous dispersion include mixtures of water-insoluble solvents with water-soluble solvents, the amount of the water-insoluble solvent in most cases being greater than the water-soluble solvent. Suitable water-soluble solvents are, for example, mono- or di-alcohols, lower ketones, (poly)glycol esters, and (poly)glycol ethers, or mixtures of such solvents. Examples of water-insoluble solvents include esters, ethers, and higher ketones. Preferred water-insoluble solvents include esters or ketones, such as ethyl acetate, butyl acetate, and methyl ethyl ketone. Preferred water-soluble solvents include glycol ether. Aqueous dispersions that are typically free of or essentially free of organic solvent, e.g. less than 5% by weight of organic solvent, can be prepared by subsequently removing the solvent by distillation.

Useful treatment compositions comprise the active composition in an amount between 0.5% and 60% by weight, suitably between 2% and 40%, typically between 5% and 25%. The composition according to the invention can be used to treat the surface of a substrate, in particular a hard surface such as that of natural stone, such as granite and marble, and man-made stone, such as concrete, terracotta and grout.

The hard surfaces can be treated with an aqueous dispersion comprising the fluorinated compound, the acrylic polymer and the silicate, using a variety of techniques, including spray application or brush application, immersion and roll coating. The treatment composition can be applied as a single layer or as two or more superimposed layers. In one embodiment, the treatment composition can advantageously be applied to the substrate surface at the end of the production process of the substrate, such as for example as a last step in the wet cast process, i.e. before the substrate is completely cured and dried. In an alternative embodiment, the treatment composition can be applied to finished substrates, such as concrete tiles.

The amount of the treatment composition applied to the hard surface in accordance with this invention is chosen so that sufficiently high or desirable stain release or stain repellence is imparted to the substrate. The amount which is sufficient to impair desired repellency can be determined empirically and can be increased as necessary or desired.

The treated substrates can conveniently be dried at room temperature or elevated temperature for a time sufficient to dry, e.g. 10 minutes to 1 hour.

EXAMPLES

The following examples further illustrate the invention without the intention however to limit the invention thereto. All parts are by weight unless indicated otherwise.

| ABBREVIATIONS | | |
|---|---|---|
| Abbreviations | Product | Availability |
| FC-1 | PM 5000, Low Molecular weight FC acrylate aqueous dispersion at 30% solids | 3M |
| FC-2 | L20358 FC urethane oligomer aqueous dispersion at 30% solids | 3M |
| ACRYL-1 | Acronal ™ S 559 Styrene-acrylate dispersion | BASF |
| ACRYL-2 | Acronal ™ S 790 Styrene-acrylate dispersion | BASF |
| SIL-1 | Betolin ™ Li22 Li-silicate solution | Woellner |
| SIL-2 | Betolin ™ Li24 Li-silicate solution | Woellner |
| SIL-3 | Betolin ™ P35 K-silicate solution | Woellner |
| SIL-4 | Betolin ™ P50 K-silicate solution | Woellner |
| SIL-5 | PQ ™ K(2,15)34/36 F K-silicate solution | PQ Europe |
| SIL-6 | PQ ™ K(2,5) 26/29 F K-silicate solution | PQ Europe |

Methods of Application and Testing

Treatment mixtures were applied to 10×10 cm test samples of grey concrete tiles, available from Coeck, Belgium by brush application until saturation. Excess treatment mixture was removed after 15 minutes using a dry paper towel. The treated stones were conditioned for 1 week at room temperature before testing.

The treated substrates were tested for stain repellency, oil repellency (OR) and water/IPA repellency (WR).

Respective data of stain repellency, water and oil repellency shown in the Examples and Comparative Examples were based on the following methods of measurement and evaluation criteria:

Stain Repellency Test (SR)

The stain resistance test was performed using oil and water based stains:

Olive Oil (Bertoli)
Motor Oil (15W40)
Mayonnaise (Devos Lemmens)
Expresso coffee (Douwe Egberts)
Red wine (Vin de Table Rouge, Le Tonnelier, France)
Coca Cola®

Staining of the test samples was done by putting 10 drops of the oil and/or water based stains on 10 cm×10 cm test samples. The stain was left on the substrate for 24 hours. The substrates were then cleaned with a paper towel to blot away the staining substance, followed by cleaning the samples with tap water and a paper towel until no further residue could be removed. After drying the degree of staining was visually evaluated and was given a rating between 1 and 8. A stain rating of 8 meant that the stain could completely be removed. A rating of 1 was given for a stain that could not be removed at all.

Oil Repellency (OR)

The oil repellency of a substrate was measured by the American Association of Textile Chemists and Colorists (AATCC) Standard Test Method No. 118-1983, which test was based on the resistance of a substrate to penetration by oils of varying surface tensions. Treated substrates resistant only to Nujol(Registered trademark) mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

| Standard Test Liquids | |
|---|---|
| AATCC Oil Repellency Rating Number | Compositions |
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Water/IPA Repellency Test (WR)

The water repellency (WR) of a substrate was measured using a series of water-isopropyl alcohol test liquids and was expressed in terms of the 'WR' rating of the treated substrate. The WR rating corresponds to the most penetrating test liquid which does not penetrate or wet the substrate surface after 15 seconds exposure. Substrates which are penetrated by or are resistant only to 100% water (0% isopropyl alcohol), the least penetrating test liquid, were given a rating of 0, whereas substrates resistant to 100% isopropyl alcohol (0% water), the most penetrating test liquid, were given a rating of 10. Other intermediate ratings were calculated by dividing the percent isopropylalcohol in the test liquid by 10, e.g., a treated substrate resistant to a 70%/30% isopropyl alcohol/water blend, but not to an 80%/20% blend, would be given a rating of 7.

Examples 1 to 5 and Reference Examples Ref 1 to Ref 10

In examples 1 to 5, blends were made containing 3% of FC-1, 5% silicate and 5% acrylic resin as given in table 2.

Reference examples Ref 1 to Ref 5 were made without FC-1 and reference examples Ref 5 to Ref 10 were made without use of acrylic resin. The treatment mixtures were brush applied according to the general procedure onto grey concrete tiles, available from Coeck, Belgium. The treated samples were conditioned at room temperature during 1 week and were then tested for stain repellency, OR and WR. The results are given in table 3.

TABLE 2 composition of examples

| Ex | FC | Silicate | Styrene acrylate |
|---|---|---|---|
| 1 | 3% FC-1 | 5% SIL-1 | 5% ACRYL-1 |
| 2 | 3% FC-1 | 5% SIL-2 | 5% ACRYL-1 |
| 3 | 3% FC-1 | 5% SIL-3 | 5% ACRYL-1 |
| 4 | 3% FC-1 | 5% SIL-4 | 5% ACRYL-1 |
| 5 | 3% FC-1 | 5% SIL-5 | 5% ACRYL-1 |
| Ref 1 | 3% FC-1 | 5% SIL-1 | / |
| Ref 2 | 3% FC-1 | 5% SIL-2 | / |
| Ref 3 | 3% FC-1 | 5% SIL-3 | / |
| Ref 4 | 3% FC-1 | 5% SIL-4 | / |
| Ref 5 | 3% FC-1 | 5% SIL-5 | / |
| Ref 6 | / | 5% SIL-1 | 5% ACRYL-1 |
| Ref 7 | / | 5% SIL-2 | 5% ACRYL-1 |
| Ref 8 | / | 5% SIL-3 | 5% ACRYL-1 |
| Ref 9 | / | 5% SIL-4 | 5% ACRYL-1 |
| Ref 10 | / | 5% SIL-5 | 5% ACRYL-1 |

TABLE 3

| Ex | OR | WR | Olive oil | Motor Oil | Red Wine | Expresso | Total stain |
|---|---|---|---|---|---|---|---|
| 1 | 5 | 2 | 7 | 7.5 | 6.5 | 7.5 | 7.1 |
| 2 | 5 | 4 | 8 | 8 | 6 | 7.5 | 7.4 |
| 3 | 5 | 2 | 7 | 8 | 5 | 7.5 | 6.9 |
| 4 | 4 | 2 | 7 | 7.5 | 6.5 | 7.5 | 7.1 |
| 5 | 3 | 2 | 7 | 7 | 7 | 7.5 | 7.1 |
| Ref 1 | | | Dispersion coagulated | | | | |
| Ref 2 | | | Dispersion coagulated | | | | |
| Ref 3 | 5 | 2 | 6 | 6 | 4 | 7 | 5.8 |
| Ref 4 | 5 | 2 | 6 | 6 | 5 | 7 | 6.0 |
| Ref 5 | 5 | 2 | 7 | 6 | 4 | 7 | 6.0 |
| Ref 6 | 0.5 | 0 | 2 | 5 | 3 | 6.5 | 4.1 |
| Ref 7 | 0.5 | 0.5 | 1 | 3 | 4 | 6.5 | 3.6 |
| Ref 8 | 0 | 0 | 1 | 2 | 3 | 6 | 3.0 |
| Ref 9 | 0 | 0 | 1 | 2 | 3 | 6 | 3.0 |
| Ref 10 | 0 | 0 | 1 | 1 | 3 | 6 | 2.8 |

Examples 6 to 15 and Reference Examples Ref 11 to Ref 15

Examples 6 to 15 were made with blends made of 3% FC-2 with 5% silicate and 5% acrylic resins as given in table 4. Reference examples Ref 11 to Ref 15 were made without the use of acrylic resin. The treatment mixtures were brush applied according to the general procedure onto grey concrete tiles, available from Coeck, Belgium. The treated samples were conditioned at room temperature during 1 week and were then tested for stain repellency. The results are presented in table 5.

TABLE 4 composition of examples

| Ex | FC | Silicate | Styrene acrylate |
|---|---|---|---|
| 6 | 3% FC-2 | 5% SIL-1 | 5% ACRYL-1 |
| 7 | 3% FC-2 | 5% SIL-2 | 5% ACRYL-1 |
| 8 | 3% FC-2 | 5% SIL-3 | 5% ACRYL-1 |
| 9 | 3% FC-2 | 5% SIL-4 | 5% ACRYL-1 |
| 10 | 3% FC-2 | 5% SIL-5 | 5% ACRYL-1 |
| 11 | 3% FC-2 | 5% SIL-1 | 5% ACRYL-2 |
| 12 | 3% FC-2 | 5% SIL-2 | 5% ACRYL-2 |
| 13 | 3% FC-2 | 5% SIL-3 | 5% ACRYL-2 |
| 14 | 3% FC-2 | 5% SIL-4 | 5% ACRYL-2 |
| 15 | 3% FC-2 | 5% SIL-5 | 5% ACRYL-2 |
| Ref 11 | 3% FC-2 | 5% SIL-1 | / |
| Ref 12 | 3% FC-2 | 5% SIL-2 | / |
| Ref 13 | 3% FC-2 | 5% SIL-3 | / |
| Ref 14 | 3% FC-2 | 5% SIL-4 | / |
| Ref 15 | 3% FC-2 | 5% SIL-5 | / |

TABLE 5

Repellency properties

| Ex | Olive oil | Motor Oil | Red wine | Expresso | Total stain |
|---|---|---|---|---|---|
| 6 | 8 | 8 | 6 | 7.5 | 7.4 |
| 7 | 6 | 8 | 8 | 7 | 6.8 |
| 8 | 6 | 8 | 6 | 7 | 6.8 |
| 9 | 6 | 7 | 6 | 7 | 6.5 |
| 10 | 6 | 7 | 5 | 7 | 6.3 |
| 11 | 7 | 7.5 | 5 | 6 | 6.4 |
| 12 | 5 | 5 | 5 | 7 | 5.5 |
| 13 | 6 | 6.5 | 4 | 7 | 5.9 |
| 14 | 7 | 5 | 5 | 7 | 6.0 |
| 15 | 6 | 5 | 5 | 7 | 5.8 |
| Ref 16 | 4 | 5 | 3 | 6 | 4.5 |
| Ref 17 | 5 | 4 | 3 | 6.5 | 4.6 |
| Ref 18 | 4 | 4 | 3 | 6 | 4.3 |
| Ref 19 | 4 | 4 | 3 | 6 | 4.3 |
| Ref 20 | 2 | 2 | 3 | 6.5 | 3.4 |

What is claimed is:

1. A method for providing stain release or stain repellence properties to natural or man-made stone, the method comprising applying a treatment composition to the natural or man-made stone, wherein the treatment composition comprises (i) a fluorinated compound, (ii) a potassium or lithium silicate and (iii) an acrylic polymer, dispersed in water; wherein stains are removable from natural or man-made stone having the composition disposed thereon; wherein the treatment composition comprises a total amount of (i), (ii), and (iii) in an amount between 0.5% and 60% by weight.

2. The method according to claim 1 wherein stains caused by oils, food dressings, wine, coffee, tea, or soft drinks are removable from natural or man-made stone having the composition disposed thereon.

3. The method according to claim 1 wherein said acrylic polymer is selected from the group consisting of homo- and copolymers of an acrylate.

4. The method according to claim 3 wherein said acrylic polymer is a copolymer of an acrylate and styrene.

5. The method according to claim 1 wherein the amount of fluorinated compound is between 10 and 70% by weight of the total weight of solids.

6. The method according to claim 1 wherein the fluorinated compound comprises one or more perfluorinated hydrocarbon residues having at least 3 carbon atoms.

7. The method according to claim 6 wherein the perfluorinated hydrocarbon residues have 4 to 6 carbon atoms each.

8. A method for providing stain release or stain repellence properties to natural or man-made stone, the method comprising applying a treatment composition to the natural or man-made stone, wherein the treatment composition comprises (i) a fluorinated compound, (ii) a potassium or lithium silicate and (iii) an acrylic polymer, dispersed in water;
   wherein the fluorinated compound comprises one or more units derived from a fluorinated monomer of the formula:

$R_f$-Q-E wherein:
      $R_f$ represents a partially or fully fluorinated aliphatic group having 3 to 12 carbon atoms;
      Q represents a covalent bond or a non-fluorinated organic linking group; and
      E represents a free radical polymerizable group;
   wherein the treatment composition comprises a total amount of (i), (ii), and (iii) in an amount between 0.5% and 60% by weight.

9. A method for providing stain release or stain repellence properties to natural or man-made stone, the method comprising applying a composition to the natural or man-made stone, wherein the composition comprises (i) a fluorinated compound, (ii) a potassium or lithium silicate and (iii) an acrylic polymer, dispersed in water;
   wherein the fluorinated compound is a reaction product of an isocyanate, a fluorinated oligomer having an isocyanate reactive group, and an aliphatic compound having an isocyanate reactive group;
   wherein the fluorinated oligomer having an isocyanate reactive group is a free-radical polymerization reaction product of fluorinated monomers and optionally non-fluorinated monomers in the presence of a mercapto functional chain transfer agent;
   wherein the fluorinated monomers are represented by the formula:

$R_f$-Q-C($R_1$)=C($R_2$)$_2$  (II)

wherein:
      Rf represents a partially or fully fluorinated aliphatic group having 3 to 12 carbon atoms;
      Q represents a covalent bond or a non-fluorinated organic linking group;
      $R_1$ represent H or a lower alkyl group having 1 to 4 carbon atoms; and
      each $R_2$ independently represents H or a straight chain or branched chain alkyl group having 1 to 4 carbon atoms;
   wherein the optional non-fluorinated monomers are represented by the formula:

$R_h$-Q'-C($R^3$)=C($R^4$)$_2$  (IV)

wherein:
      $R_h$ represents a non-fluorinated group;
      Q' represents a covalent bond or a non-fluorinated organic linking group;
      $R^3$ represent H or a lower alkyl group having 1 to 4 carbon atoms; and
      each $R^4$ independently represents H or a straight chain or branched chain alkyl group having 1 to 4 carbon atoms; and
   wherein the mercapto functional chain transfer agent is represented by the formula:

R'(SH)$_m$ wherein:
      R' represents a hydrocarbon group comprising an isocyanate reactive group; and
      m is 1 to 4.

10. The method according to claim 9 wherein the fluorinated monomers are selected from the group consisting of:
   $CF_3CF_2CF_2CF_2CH_2CH_2OCOCR_3=CH_2$
   $CF_3(CF_2)_3CH_2OCOCR_3=CH_2$
   $CF_3(CF_2)_3SO_2N(CH_3)CH_2CH_2OCOCR_3=CH_2$
   $CF_3(CF_2)_3SO_2N(C_2H_5)CH_2CH_2OCOCR_3=CH_2$
   $CF_3(CF_2)_3SO_2N(CH_3)CH_2CH(CH_3)OCOCR_3=CH_2$
   $(CF_3)_2CFCF_2SO_2N(CH_3)CH_2CH_2OCOCR_3=CH_2$
   $CF_3CF_2(CF_2CF_2)_2CH_2CH_2OCOCH=CH_2$
   wherein $R_3$ is hydrogen, methyl or n-butyl.

11. The method according to claim 9 wherein the aliphatic compound having an isocyanate reactive group is represented by the formula:

$R^3$—(Z)$_q$ wherein:
      Z is an isocyanate reactive group selected from the group consisting of an amino group, a hydroxy group, and a carboxyl group;
      q is 1 to 4; and
      $R^3$ is an organic aliphatic group having from 1 to 75 carbon atoms.

12. The method according to claim 11 wherein Z is a hydroxyl group, q is 1, and $R^3$ is a monovalent alkyl group having from 12 to 75 carbon atoms.

13. The method according to claim 9 wherein the isocyanate is selected from the group consisting of a biuret-containing triisocyanate, an isocyanurate-containing tri-isocyanate, and an azetedinedione-containing diisocyanate.

14. A method for providing stain release or stain repellence properties to natural or man-made stone, the method comprising applying a composition to the natural or man-made stone, wherein the composition comprises (i) a fluorinated compound, (ii) a potassium or lithium silicate and (iii) an acrylic polymer, dispersed in water;
   wherein the fluorinated compound corresponds to at least one compound of the following formulas:

[(A)$_m$L]$_n$R wherein:
      m is a value of 1 to 4;
      n is a value of 1 to 3;
      L represents a linking group;
      R is an aliphatic group; and
      A is a fluorinated residue of the formula:

$$X^1-[\underset{\underset{Rf}{Q}}{\overset{\overset{R_1}{|}}{C}}-\underset{\underset{}{R_2}}{\overset{\overset{R_2}{|}}{C}}]a-[\underset{\underset{Rh}{Q'}}{\overset{\overset{R_1}{|}}{C}}-\underset{\underset{}{R_2}}{\overset{\overset{R_2}{|}}{C}}]b-S-$$

wherein:
      a has a value of 1 to 100;
      b has a value of 0 to 100;
      the sum of a and b being at least 2;
      $R_1$ and $R_2$ each independently represent H or an alkyl group of 1 to 4 carbon atoms;
      Q and Q' each independently represent a covalent bond or a non-fluorinated organic linking group;
      Rf represents a partially or fully fluoroaliphatic group having 3 to 12 carbon atoms;

Rh represents a non-fluorinated group; and $X^1$ is H or the residue of a free radical initiator.

15. The method according to claim 14 wherein the composition comprises (i) the fluorinated compound in an amount of 10 to 70% by weight of the total weight of solids, (ii) the potassium or lithium silicate in an amount of 10 to 80% by weight of the total weight of solids and (iii) the acrylic polymer in an amount of 10 to 80% by weight of the total weight of solids.

16. The method according to claim 14 wherein:

m is a value of 1 to 4;

n is a value of 1 to 3;

L is selected from the group consisting of a straight chain, branched chain, or cyclic alkylene, arylene, aralkylene, oxy, oxo, hydroxy, thio, sulfonyl, sulfoxy, amino, imino, sulfonamido, carboxamido, carbonyloxy, urethanylene, ureylene, and combinations thereof;

R is a branched aliphatic group having 12 to 75 carbon atoms; and

A is a fluorinated residue of the formula:

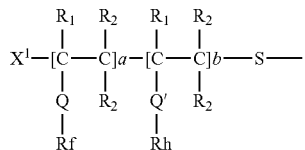

wherein:

a has a value of 1 to 100;

b has a value of 0 to 100;

the sum of a and b being at least 2;

$R_1$ and $R_2$ each independently represent H;

Q and Q' each independently represent a non-fluorinated organic linking group;

Rf represents a fluoroaliphatic group having 3 to 12 carbon atoms;

Rh represents a non-fluorinated group; and $X^1$ is H or the residue of a free radical initiator.

17. The method according to claim 16 wherein:

Q and Q' are each independently selected from the group consisting of straight chain, branched chain or cyclic alkylene, arylene or aralkylene groups, sulfonyl, sulfoxy, sulfonamido, carbonamido, carbonyloxy, urethanylene, ureylene, oxy, and combinations thereof;

Rf represents a fully fluorinated aliphatic group having 4 to 6 carbon atoms; and X' is the residue of an azo free radical initiator.

* * * * *